United States Patent [19]

Bahder

[11] 4,354,992
[45] Oct. 19, 1982

[54] ELECTROCHEMICAL TREE RESISTANT POWER CABLE

[75] Inventor: George Bahder, Edison, N.J.

[73] Assignee: Cable Technology Labs., Inc., New Brunswick, N.J.

[21] Appl. No.: 235,090

[22] Filed: Feb. 17, 1981

Related U.S. Application Data

[63] Continuation-in-part of Ser. No. 147,212, May 6, 1980, abandoned.

[51] Int. Cl.³ .............................................. B29D 9/04
[52] U.S. Cl. ....................................... 264/85; 156/51; 264/510; 264/514; 264/555; 264/558; 264/174
[58] Field of Search ..................... 264/40.3, 40.6, 510, 264/514, 519, 555, 558, 174, 176 R, 236, 237; 156/51

[56] References Cited

U.S. PATENT DOCUMENTS

| 2,656,566 | 10/1953 | Berggren | 264/174 |
| 3,538,207 | 11/1970 | Toole | 264/510 |
| 3,689,610 | 9/1972 | Nicholson | 264/40.3 |
| 3,737,490 | 6/1973 | Nicholson | 264/40.3 |
| 3,769,085 | 10/1973 | Matsbara | 156/51 |
| 3,800,019 | 3/1974 | Parsey | 264/174 |
| 3,868,436 | 2/1975 | Ootsuji et al. | 264/40.6 |
| 3,869,235 | 3/1975 | Moore | 264/555 |
| 3,922,128 | 11/1975 | Solomon | 264/174 |
| 3,928,525 | 12/1975 | Fuwa et al. | 264/237 |
| 4,089,917 | 5/1978 | Takiura et al. | 264/40.3 |

Primary Examiner—Jerome W. Massie
Attorney, Agent, or Firm—Darby & Darby

[57] ABSTRACT

An improved method and apparatus for fabricating insulated cables, particularly polymeric insulated electrical power cables, resistant to the formation and growth of electrochemical trees is disclosed. Internal pressure on the conductor side of the cable when it is maintained lower than the external pressure on the outer surface of the insulation during extrusion. Extrusion pressure higher than the external pressure results in expansion of the insulation following extrusion. This expansion or swelling reduces the number and size of cracks and voids which are precursors of electrochemical trees. In addition, pressure curing the extruded, insulated cable with a curing medium above its melting point followed by gradual gradient cooling under internal pressure and higher external cooling fluid pressure to around room temperature optimizes the resistance of the cable to nucleation and growth of electrochemical trees.

21 Claims, 9 Drawing Figures

ELECTROCHEMICAL TREE RESISTANT POWER CABLE

This application is a continuation-in-part of my co-pending application Ser. No. 147,212, filed May 6, 1980, now abandoned.

This invention relates to an improvement in the manufacture of insulated electric power cables. More specifically, it relates to a method and means of improved fabrication techniques for reducing insulation failures in underground sections of these cables.

Power cables of the type here involved generally consist of the stranded conductor, an extruded semiconducting conductor shield, a polymeric insulation (such as polyethylene (PE), cross-linked polyethylene (XLPE), ethylene propylene rubber (EPR) and others), a semiconducting insulation shield, metallic shield, and optionally a polymeric jacket. It is recognized that when moisture, or other conducting liquid enters into the insulation structure of energized polymeric insulated cables it forms so-called electrochemical trees in the areas of critical imperfections.

These electrochemical trees are discussed in my co-pending Applications Ser. Nos. 5,320 and 5,321, both of which were filed on Jan. 22, 1979. These trees consist of small channels that decrease the dielectric strength of the polymeric insulation. Microscopic observation of wafers taken from cross-linked polyethylene cable insulation indicate that the electrochemical trees originate from cracks or oblong voids in the insulation adjacent to imperfections which consist of conducting particles or other foreign inclusions. This observation also indicates that the electrochemical trees are more plentiful in the portion of insulation adjacent to the conductor shield, becoming smaller and less numerous in the insulation close to the insulation shield in cables in which these three layers (conductor shield, insulation and insulation shield) are extruded, cured and cooled in a single operation. This characteristic was originally attributed to lower voltage stress at the insulation shield than at the center of the insulation or at the conductor shield.

Further studies now indicate that the main reason for this irregular distribution of these trees may be attributed to problems associated with the conventional, currently utilized manufacturing processes for polymeric insulated cables. These processes induce relatively small imperfections in the insulation close to the insulation shield. The severity of these imperfections in the insulation increases towards the conductor shield.

Imperfections causing induction of electrochemical trees consist of small cracks and small or large voids, especially oblong in the field direction, which when filled with water create high electric stresses. Cracks in the insulation, although typically very small (e.g. less than 1 mil long) are believed to be the most common cause for formation of electrochemical trees.

Under typical manufacturing conditions, in the case of cross-linked polyethylene and ethylene propylene rubber insulated cables, the three layers (conductor shield, insulation and insulation shield) are extruded, cross-linked and cooled under pressure, or just extruded and cooled under pressure in the case of polyethylene insulated cables. In both cases the temperature of the three cable core layers, just before cooling, ranges from 250 to 550 degrees Fahrenheit.

The thermal expansion coefficient of polyolefin insulation is relatively high. The volume of the insulation just before cooling is up to 10 to 16% larger than the volume of this insulation at room temperature. In conventional cable manufacturing processes, the coolant (such as water, nitrogen, etc.) is applied under pressure to the external surface of the extruded cable core. Hence, cooling and solidification begins from the external surface of the cable core and progresses gradually towards the conductor. Prior to beginning the cooling process, the insulation system is soft and is compressed against the conductor by the coolant. During cooling, the external part of the cable core solidifies and acts as a rigid pipe barrier while the internal part of the insulation system, which is still soft, contracts and subsequently solidifies.

Contraction and solidification of the internal soft part of the insulating system within the solidified external part of the cable core occurs at a relatively low pressure because the pressure of the coolant is substantially diminished by the presence of the external solidified part of the cable core. Thus, the pressure at which the cable core is solidified equals the coolant pressure at the insulation shield surface, but this pressure decreases rapidly in direction towards the conductor as the external portion of the insulation solidifies.

Consequently, the number and size of the imperfections which induce electrochemical trees and decrease dielectric strength of the insulation is smallest at the insulation shield side. The number and size of the imperfections increase towards the conductor shield where the voltage stress is the highest.

Polymeric insulation structures are compressible. The liquid or gas pressure applied during the cooling of these structures compresses the solidified part of the cable core, but compensates only partially for the deficiency in compound volume during cooling of the internal part of the cable core. Consequently, the internal part of the cable core is cooled and solidified at a lower pressure than the outside. As the thickness of the wall of the insulation system increases, the greater is the pressure drop (and hence the level of imperfections) towards the conductor during cable core solidification.

During cable core cooling, the insulation structure, especially in the case of thermoset materials, also has an internal pressure created by vapors and gases generated by the cross-linking reaction and also by the dissolution of contaminants such as air, steam and other vapors existing in the compounds. External pressure applied to the insulation system during its solidification tends to suppress the internal pressures from the gases in the insulation. This in turn reduces the void sizes in the insulation.

In addition, application of external pressure during cooling causes mechanical stresses in the radial direction of the insulation system. When the cable core leaves the pressurized cooling pipe, the mechanical stresses relax, causing a small radial expansion of the insulation which facilitates the formation of cracks and oblong voids especially at contaminants and protrusions of the conductor and insulation shield layers. These cracks and voids constitute the most critical imperfections in the insulation structure and lead to the formation of electrochemical trees and to the premature failure of the cable.

Conventionally, in the manufacture of crosslinked polyethylene and ethylene-propylene rubber insulated cables, pressure extrusion is utilized without internal gas or liquid pressure in the cable conductor and without gradient cooling of the cable core. It has been found that the increase in diameter or swelling of the cable core by more than 3% of the insulation shield diameter is necessary to reduce the number and size of the oblong voids in the insulation. In addition gradient cooling of the cured insulated cable is also necessary to reduce the number and size of the oblong voids in the insulation. Gradient cooling refers to a gradual cooling of the cured insulated cable which takes place along the length of the cooling pipe. The cured insulated cable is gradiently cooled from the temperature of the cured insulated cable, as it leaves the curing step, down to about room temperature at the end of the cooling pipe furthest away from the curing section of the apparatus.

Some cooling naturally occurs in pressurized cooling tubes used in lines for manufacturing crosslinked polyethylene and ethylene-propylene rubber insulated cables. However, the difference between the temperature of the cured insulated cable as it leaves the curing section and the temperature of the cooling medium closest the curing section is too large. This temperature difference results in abrupt cooling leading to cables vulnerable to the formation of electrochemical trees.

Gradient cooling is used in polyethylene insulated cables which are not resistant to the formation of electrochemical trees but the low resistance has been found to be a result of the absence of internal and external pressure during the cooling.

U.S. Pat. No. 3,737,490 discloses pressurization of the conductor to produce an extruded composite covering. This covering comprises two or more layers of different covering materials extruded over a continuously advancing core by a float down process. Pressurization is set forth in conjunction with the extrusion of cables having a diameter smaller than the diameter of the die of the extrusion head. Consequently the insulation structure produced by the prior art process is not compressed in the head and the die. Such a process has been found to lead to a porous insulation structure which is vulnerable to the formation of electrochemical trees. It has been found that in order to produce a cable with high dielectric strength, the cable insulation structure must be compressed in the head and in the die. The diameter of the cable exiting the die must be greater than the diameter of the die.

The essence of the present invention is to provide polymer insulated cables having higher resistance to the formation and growth of electrochemical trees by applying internal and external extrusion pressure to the conductor in combination with gradual gradient cooling of the insulated cable.

In addition, I have found that the sensitivity of the polymeric insulated cables to the formation of electrochemical tree also depends on the medium used for curing and cooling, on the type of compound used for insulation.

It is established in accordance with this invention that each of the following steps reduce the formation of cracks and oblong voids in the insulation structure during its manufacturing process:

(a) extruding the insulation structure at high pressure and subsequently internally and externally compressing the insulation structure at a pressure slightly lower than the extrusion pressure in the radial direction during curing and cooling;

(b) curing the insulation in a specially selected fluid;

(c) cooling the insulation with a gradual temperature gradient to minimize formation of cracks in the insulation, starting the cooling process at a temperature higher than the melting temperature of the curing compound and finishing the cooling process at around room temperature, and;

(d) modifying the insulation compound to reduce its sensitivity to cracking.

In accordance with the present invention, a method and means are provided whereby insulated power cable rated 10 kv and above has three layers (conductor shield, insulation and insulation shield) pressure extruded, pressurized internally (from the stranded conductor side) and externally (from the insulation side), cured, and cooled under a temperature gradient starting at a temperature higher than the melting temperature of the insulation and gradually decreasing to room temperature or lower. In so doing, the cracks and voids in the insulation are reduced in size and number, and are more uniformly distributed throughout the insulation. This in turn reduces insulation imperfections such as the above-referenced electrochemical trees, and thereby extends the useful life of the power cable.

It is therefore an object of this invention to provide a method and means for fabricating an improved insulated electric power cable rated 10 kv and above characterized by a reduction in the number and size of cracks and voids in insulation and by a more uniform distribution of these voids in the insulation.

It is another object of this invention to provide a method and means for pressure extrusion of the insulation structure, for pressurizing the insulated power cable internally and for gradual curing and cooling of the insulation structure during the cable fabrication so as to provide an improved, more failure-resistant, cable.

It is a further object of this invention to provide a method and means for controlling both the internal and external pressure exerted against the insulation coating of an electric power cable during its fabrication so as to improve the reliability and performance characteristics of that insulation when the cable is put in service.

It is a still further object of this invention to provide an insulated power cable especially well suited to resist breakdown in insulation frequently encountered by contact with moisture in underground installations.

It is a still further object of this invention to provide the above-described cable through the use of relatively simple and inexpensive means and method.

The above-described objects, advantages and features of the invention will be apparent from the following description in conjunction with the appended drawings, in which.

Figure 1:
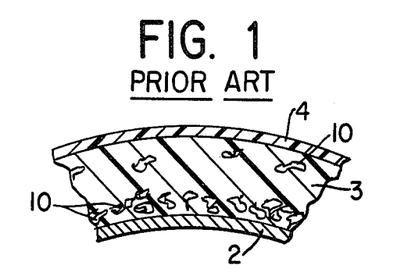
FIG. 1 is a partial cross-section schematically illustrating the distribution and location of imperfections in a typical prior art insulated power cable.

Referring to FIG. 1, there is shown schematically the manner of distribution of voids or imperfections between the conductor shield and insulation shield in a typical prior art power cable. Note that the imperfections are concentrated in the portion more closely adjacent the conductor shield. The apparent reason for this is discussed above, i.e., pressure distribution and temperature gradient during the insulation cooling process.

Figure 2:
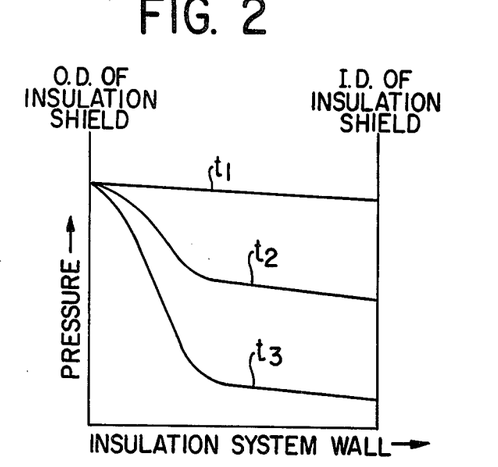
FIG. 2 is a graph qualitatively representing pressure distribution in the insulation at times corresponding to the cooling stages of the insulation in a typical prior art insulated power cable.

Referring to FIG. 2, the referenced pressure distribution is qualitatively represented. Curve $t_1$ represents pressure distribution just prior to the cable core cooling. Curve $t_2$ represents pressure distribution when a part of the external layer of the cable core is already solidified. Curve $t_3$ represents pressure distribution in the cable core at a longer cooling time than that corresponding to curve $t_2$.

Figure 3:
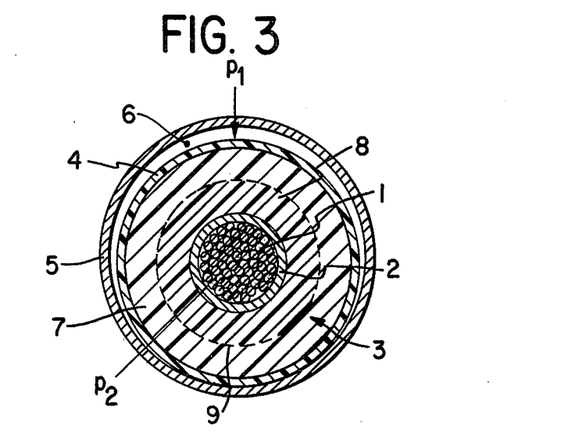
FIG. 3 is a cross-section of an embodiment of a cable in accordance with the present invention.

Referring now to FIG. 3, the basic principles of the invention (when used in conjunction with the horizontal mini-pipe extrusion system described in U.S. Pat. No. 4,080,131) is illustrated. The cable core consisting of conductor 1, conductor shield 2, insulation 3 and insulation shield 4 is cooled in a pipe 5 filled with a pressurized fluid cooling medium 6 such as steam, gas or other liquid. For illustration purposes, the insulation 3 is divided by the boundary 9 into two regions of solidified (7) and soft (8) insulation. During the cooling process, the boundary 9 moves towards the center of the conductor.

Figures 4, 4B:
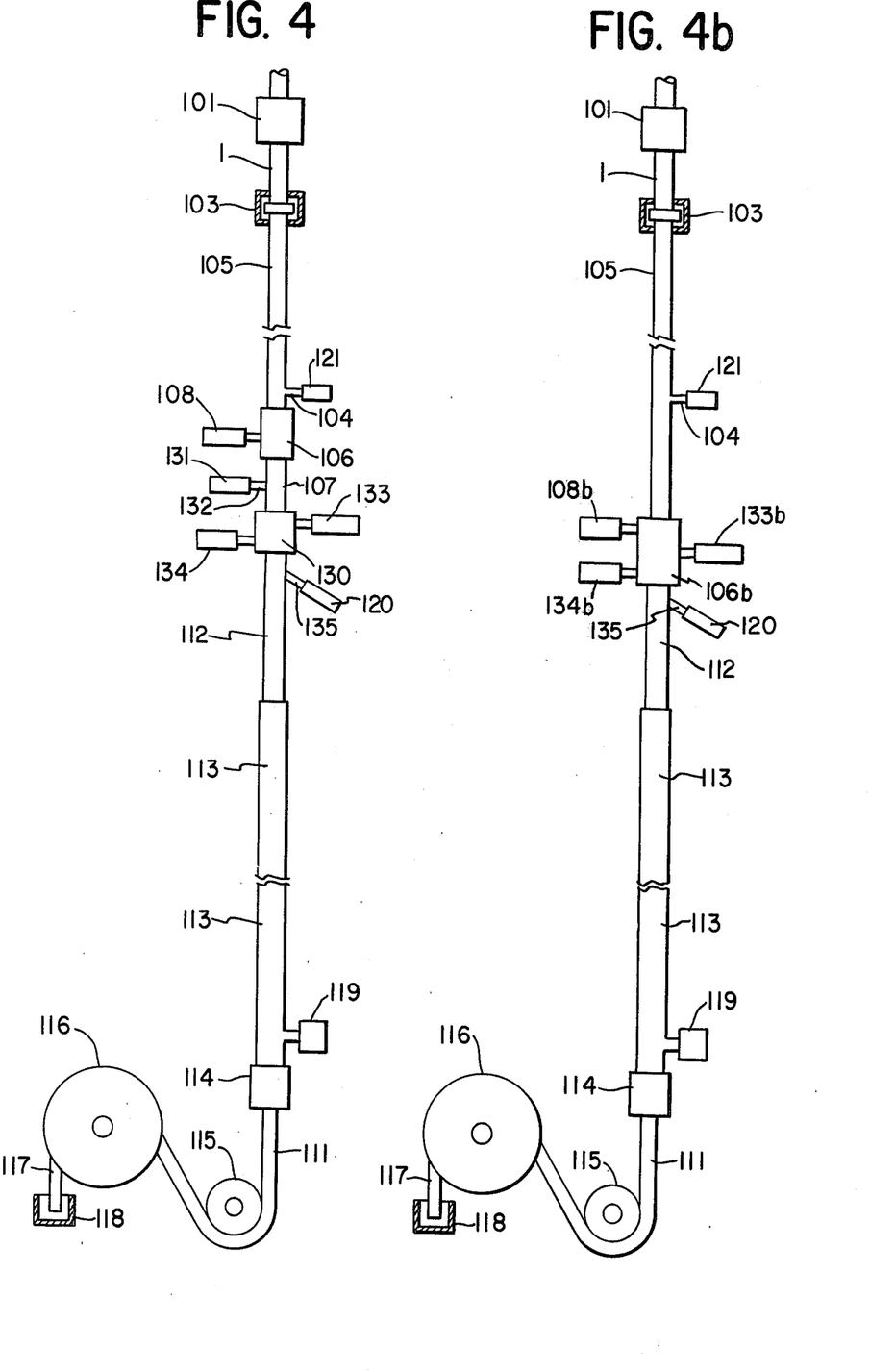
FIGS. 4, 4a and 4b are schematic diagrams of three embodiments of an extrusion line suitable for fabricating cable in accordance with this invention.

Referring to FIG. 4 there is shown a schematic diagram of a first embodiment of a horizontal extrusion line for manufacture of cables in accordance with this invention. The extrusion line includes a metering capstan 101 for the stranded cable conductor 1. Conductor 1 passes through a seal 103 that minimizes the overflow of gas or liquid which is introduced into the conductor 1 by pump 121 through an inlet 104. A pipe 105 which is attached to a single extrusion head 106 on one end and to seal 103 on the other end minimizes the loss of gas or liquid delivered by pump 121. A conductor shield is pressure extruded over the conductor 1 by conductor shield extruder 108 in single head 106. The conductor and conductor shield then pass through gas pressurized tube 107, having one end sealed to the single head 106 and the other end sealed to a double head 130. The tube is pressurized with air or other gas as through inlet 132 by pump 131. An insulation layer is pressure extruded by extruder 133 over the conductor shield and an insulation shield is then pressure extruded by extruder 134 over the insulation layer in the dual head 130.

The cable core 111 extruded by single head 106 and dual head 130 enters into a mini-curing pipe 112, sealed on one end to the dual extrusion head 130 and on the other end to the cooling pipe 113. The core is crosslinked with the help of a curing liquid introduced into curing pipe 112 through inlet 135 by pump 120. The curing pipe is heated to any desirable curing temperature by any conventional heating means.

Subsequent to curing the cable core 111 enters into the cooling pipe 113 which is supplied with cooling fluid by pump 119. The cooling fluid seal 114 prevents the cooling liquid from escaping the cooling system. The take-up tension of the cable core is provided by the pull-out capstan 115. The cable core is wound on the take-up 116. The starting end 117 of the cable core is sealed by means of a reinforced end cup 118 (for example a heat-shrinkable or equivalent seal).

Figure 4A:
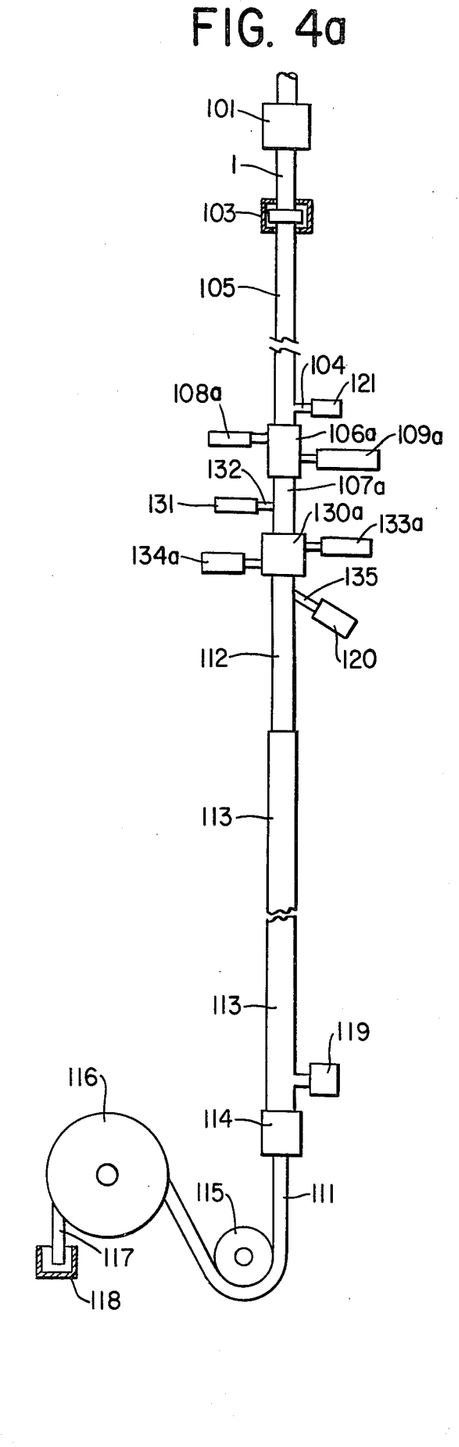

In a second embodiment shown in FIG. 4a there are two dual heads 106a and 130a. The conductor shield and a first insulation layer are pressure extruded in the first dual head 106a and a second insulation layer and the insulation shield are pressure extruded in the second dual head 130a.

In the first dual head 106 the conductor shield is pressure extruded over the conductor by the extruder 108a. The first insulation layer is then pressure extruded over the conductor shield by extruder 109a in the first dual head 106a. The conductor, conductor shield and first insualtion layer is passed through tube 107a into the second dual head 130a. A second insulation layer is pressure extruded over the first insulation layer by extruder 133a and an insulation shield is pressure extruded over the second insulation layer by extruder 134a. The cable core 111 extruded by both dual heads 106a and 130a is then cured, gradiently cooled under pressure and wound on the take-up 116 as described above as in the first embodiment.

In a third embodiment shown in FIG. 4b there is only one head 106b. The head 106b is a triple extrusion head. The conductor shield is pressure extruded in head 106b over the conductor by extruder 108b. The insulation layer is then pressure extruded over the conductor shield in head 106b by extruder 133b. The insulation shield is then pressure extruded over the insulation layer in head 106b by extruder 134b. The cable core extruded in the triple head 106b is then cured, gradually cooled under pressure and wound on the take-up 116 as in the first two embodiments.

Cables manufactured by such triple extrusion head 106 apparatus have been found on a statistical basis to have lower dielectric strength than cables manufactured with two layers of insulation as in the second embodiment. This is due to the fact that the first part of the insulation adjacent to the conductor shield will not be compressed as well as in the two dual head arrangements of the second embodiment.

When the conductor 1 is pressurized by gas, a portion of the gas escapes to the environment through seal 103. The portion of gas that escapes to the environment can be minimized by using pipe 105 with a relatively tight fit to the conductor and by increasing the length of pipe 105. If the conductor is pressurized by means of a liquid, a special collector (not shown) similar to a water seal box can be used to collect the portion of the liquid that can escape through seal 103.

The following apparatus design criteria and processing conditions are maintained to manufacture high quality polymeric insulated cables which are resistant to the formation of electrochemical trees:

1. The gas or liquid pressure, maintained by pump 121, is higher than 50 psi preferably maintained below 500 psi and always lower than the cooling fluid pressure.

2. The head 106a is designed such that the die for the extrusion of the conductor shield constitutes one part with the tip of the die for the extrusion of the first part of the insulation. This construction ensures that the insulating compound continuously cleans the die of the conductor shield preventing the accumulation of carbon black particles or carbon black clusters. These clusters would otherwise break off from the die and remain in the insulation and cause projections which lead to lower breakdown voltage and the formation of electrochemical trees in the insulation.

3. Both the conductor shield layer and the first part of the insulation layer are pressure extruded to minimize the formation of oblong voids in this part of the cable core. This is accomplished by maintaining the diameter of the first layer of the insulation slightly greater than the diameter of the die for the extrusion of this insulation. The thickness of the first part of the insulation is between 10 mils and 50 mils.

4. The gas pressure in tube 107 connecting the two heads 106 and 130 is at least 15 psi higher than the gas pressure introduced by pump 121 while at the same time at least 50 psi lower than the extrusion pressure in head 106.

5. The output of the compound from the insulation extruder is controlled so that the diameter of the cable core 111 exiting from heads 130, 130a and 130b into curing pipe 112 is at least 3% greater than the diameter of the die used for extrusion of the insulation shield. This difference in diameter assures high extrusion pressure of the insulation and minimizes formation of voids, including oblong voids, which may result in electrochemical trees in wet cable environments. The diameter of the curing pipe 112 is greater than the diameter of the insulation shield die preferrably by at least 5% but not greater than 50 of the diameter of the finished cable measured at room temperature.

6. The curing liquid pressure is not lower than 250 psi, preferably higher than 400 psi, and not lower than the cooling fluid pressure.

7. The temperature of the cooling liquid is cooling pipe 113 at the connection point of cooling pipe 113 with curing pipe 112 is higher than the melting temperature of the compounds used for the manufacture of the cable core in order to minimize internal thermal stresses in the cable core and minimize cracks and voids in the insulation structure. Preferably the temperature at this connecting point is equal to the temperature of the curing liquid which is typically in the range of 240° to 550° F. The temperature of the cooling pipe should gradually decrease by gradient cooling. The gradient cooling should be selected to maintain a temperature difference between the conductor and the insulation shield of not more than 150 degrees Fahrenheit.

Pressure extrusion with the pressurization of the conductor and gradual gradient cooling of the insulation during cable core manufacture can also be applied to conventional extrusion, curing, cooling lines arranged vertically or in a catenary configuration and utilizing steam, gas or liquid for curing and cooling of the cable core. In the case of a catenary line, the pipe 105 would have a catenary shape. Dry air or nitrogen are inexpensive gases suitable for pressurization of the conductor.

The conductor shield can also be pressurized during the manufacturing process with liquids or vaseline-type compounds having a softening point slightly below the softening point of the compounds used for cable cores. Silicone fluid, microwaxes, compounds made of polyethylene dissolved in insulating oils and mixed with microwaxes or rubber and numerous other mixtures compatible with the cable insulating system can be used for pressurization of the cable core during the manufacturing process. The vaseline-type compounds, when left between the strands of the conductor of finished cables, prevent the longitudinal flow of moisture during cable service and thereby will further improve the resistance of the cables to formation of electrochemical trees.

Figure 5:
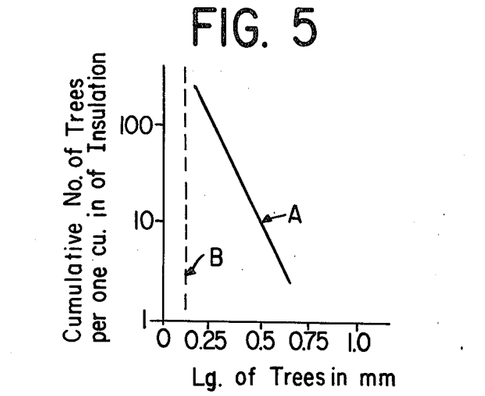
FIG. 5 is a graph representing the count of various lengths of electrochemical trees in a prior art cable and in one made in accordance with this invention.

Referring to FIG. 5, there is shown a graph representing electrochemical tree count in 15 kV cross-linked polyethylene insulated cables. Curve A relates to a conventional 15 kV cable and curve B relates to a 15 kV cable where the conductor shield was pressurized from the conductor side during gradual gradient cooling with dry nitrogen at 60 psi. Both cables were subjected to a 30 day exposure to water (in the conductor area and the cable environment) at 1500 Hz voltage, at a voltage stress of 85 volts per mil. The cable having its conductor shield pressurized during the gradual gradient cooling process (curve B) indicates a significant reduction in number and length of electrochemical trees.

Figure 6:
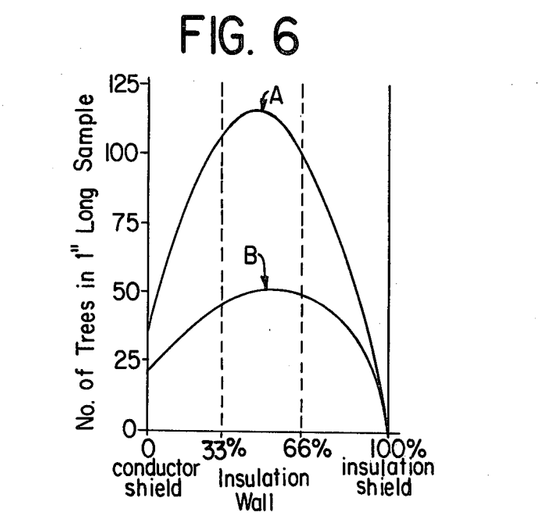
FIG. 6 is a graph representing the count of electrochemical trees longer than 2 mils, counted separately in five sections of the insulation structure.

Referring to FIG. 6, there is shown a graph representing another electrochemical tree count in 15 kv cross-sectional polyethylene cables. Curve A relates to conventional 15 kv cable and curve B relates to a 15 kv pressure extruded cable where the conductor shield was pressurized from the conductor side with dry nitrogen at 90 psi and was cooled gradually by gradient cooling. Both cables were subjected to a 90 day exposure to water, in the conductor area and in the cable environment, at 60 Hz voltage, and voltage stresses of 85 volts per mil.

In the tree count shown in FIG. 6, the trees with length in excess of 2 mils were counted separately in five sections of the insulation structure: at the conductor shield, in ⅓ of the insulation wall adjacent to the conductor shield, in ⅓ of the insulation located in the center of the insulation wall, in ⅓ of the insulation adjacent to the insulation shield, and at the insulation shield. FIG. 6 shows that the cable, pressure extruded and gradiently cooled under internal pressure, develops much fewer trees than the cable manufactured in a conventional process. The internal pressure maintained in the pressure extruded cable during gradual gradient cooling minimized the size of the cracks and oblong voids.

The samples of 15 kv cross-linked polyethylene insulated cables, having the tree count as shown in FIG. 6, were subjected to an a.c. voltage breakdown test. In this test the a.c. voltage was increased in 10 percentage steps every minute. The average breakdown voltages measured, in three cable samples of both types of cables, are given in Table 1.

TABLE 1

| Breakdown Voltage | XLPE Cable Conventional Process | XLPE Cable Pressure Extruded - Heated and Cooled under Internal Pressure in Accordance with this invention |
|---|---|---|
| Prior to treeing test kv | 195 (100%) | 169 (100%)* |
| After treeing test kv | 70 (36%) | 72 (43%) |

*The lower breakdown voltage before the treeing test of the cable made in accordance with the invention is attributed to a smaller insulation thickness caused by different processing conditions.

Table 1 indicates that the decrease in breakdown voltage at the cable manufactured in accordance with the invention occurs at a significantly lower rate than the decrease of break-down voltage of cable manufactured in a conventional way. After approximately three months of electrochemical treeing tests, the cable made in accordance with the present invention retained 43% of the original breakdown voltage while the cable of the conventional process retained only 36% of the original breakdown voltage.

In addition, I have found that the sensitivity of the polymer insulated cables to formation of electrochemical trees also depends on the medium used for curing, and to some degree on the medium used for cooling of the cable core during the manufacturing process. Cable cores dry cured under hot gas pressure (such as nitrogen) or under a pressure of a hot high molecular weight liquid (which does not penetrate into the insulation) and cooled under water are very susceptible to formation and growth of electrochemical trees. On the other hand, cable cores cured by steam and cooled by water are less susceptible to formation of electrochemical trees, although, after manufacture, they contain more moisture and exhibit more and larger voids in the insulating system than the cable cores cured in nitrogen or high molecular weight liquids.

Curing by steam has some negative and some positive effects on the insulation compound as compared with so-called dry curing performed under nitrogen or under high molecular weight liquid pressure. Steam entering the cable core during curing condenses in the insulation during cooling and forms macroscopic, spherical voids which typically decrease the dielectric strength of the insulation, but do not nucleate electrochemical trees.

The positive feature of steam curing is that steam minimizes adverse effects of the cross-linking agent, facilitates cable expansion and contraction during curing and cooling and consequently decreases the number and size of microscopic cracks or oblong voids responsible for nucleation of electrochemical trees. Hence, cable core cured in steam exhibit less susceptibility to formation of electrochemical trees than the cables cured and cooled by nitrogen or high weight molecular liquids. The disadvantages of steam curing is that moisture is introduced into the cable core during the manufacturing process and this moisture may lead to electrochemical trees even if there is no external moisture admitted to the cable during testing or servicing.

In order to further optimize cable resistance to nucleation and growth of electrochemical trees, the cable core should be cured under pressure exerted by a special curing medium. The curing medium should have good electrical properties, should have properties of a plasticizer, and should have the potential for diffusing into the insulation during the curing process. The curing medium may consist of a mixture of ingredients with at least one ingredient having the following properties:

Dielectric Constant less than 20
Resistivity greater than $10^{10}$ ohm-cm
Boiling Point At Curing Pressure greater than 85° C.
Molecular Weight less than 300

Acetophenone, high molecular weight polybutene oil, glycerol, silicone fluid, dodecylbenzene, and other liquids satisfy these conditions. The curing medium is applied preferably as a liquid at a temperature above its melting temperature. The special curing medium may be applied solely from the external side, or from both external and internal sides of the cable.

Figure 7:
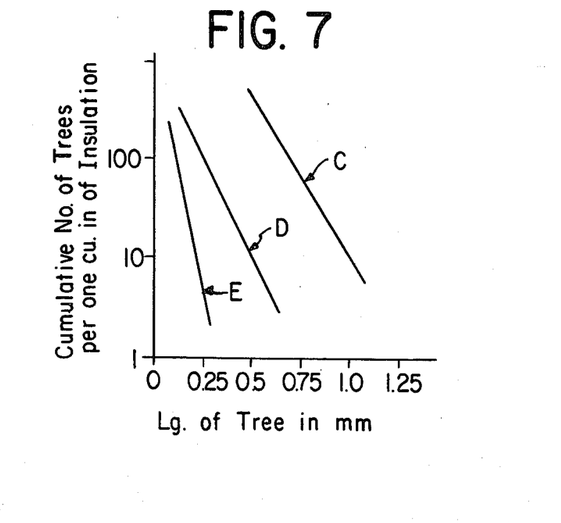
FIG. 7 is a graph representing the electrochemical tree count of cables subjected to different curing operations in accordance with this invention.

Referring to FIG. 7, this chart represents the effect of curing medium on the insulation and formation of electrochemical trees in 15 kV cross-linked polyethylene insulated cables subjected for 30 days to 1500 Hz voltage at voltage stress of 85 volts per mil with water surrounding the cable and filling the interstices of the conductor. During the curing process, these cables were not pressurized from inside. Curve C relates to a dry cured cable, curve D relates to a steam core cable, and curve E relates to a cable cured in acetophenone.

Further, I have found that the type of insulating compounds used has a significant effect on formation of cracks and voids in the insulation structure during the manufacturing process. Crosslinked polyethylene insulation extruded of copolymers such as ethylene and vinyl acetate or ethylene and ethyl acrylate is more resilient and more resistant to the formation of electrochemical trees than the insulation extruded from homopolymers. Copolymers very widely used in insulating and semiconducting compounds are filled with carbon black or clay particles because they can be well mixed with these particles to provide good adhesion between the compound and the particles. Copolymers, however, are not conventionally used in unfilled compounds designed for insulation in high voltage polymeric insulated cables rated 10 kV and above consisting of conductor shield, insulation and insulation shield. This is due to the fact that copolymers have higher loss factor, less resistance to thermal aging and higher price than the unfilled homopolymers used as insulating compounds in crosslinked polyethylene insulated cables rated 15 kV and above.

I have found that crosslinked polyethylene insulation made of unfilled copolymer is more resistant to formation of electrochemical trees than crosslinked polyethylene insulation made of unfilled homopolymers. This makes the unfilled copolymer insulation the preferred insulation for high voltage power cables of the present invention. Extension of service life of the polymeric insulation cables insulated with unfilled copolymer insulation overrides the above indicated apparent disadvantages of copolymer compounds.

An unfilled insulation with a melt index 1 and higher containing an unfilled copolymer with 5% or more of vinyl acetate or ethyl acrylate is suitable for insulation of high voltage power cables resistant to formation and growth of electrochemical trees.

In order to demonstrate the resistance of the copolymer insulation to formation of electrochemical trees a special series of tests on miniature cables was made.

Miniature XLPE insulated cables (50 mils of insulation thickness) have been manufactured with insulation made of (1) conventional Union Carbide $4201_R$ compound and (2) with ethylenevinyl acetate copolymer with a melt index 2, and containing 15% of vinyl acetate.

After manufacture, both cables were subjected to heat treatment to diffuse out the by-products of the crosslinking reaction. Subsequently, the cables were subjected to an electrochemical treeing test at 4.3 kV, 60 Hz a.c. for 24 days with water in the conductor and in the cable environment. A.C. breakdown voltages were measured on both cables after heat treatment only and after heat treatment and electrochemical treeing tests. The results in a form of average breakdown voltages (10% increase every 5 minutes), obtained on ten samples in each case, are summarized in Table 2.

TABLE 2

|  | Cables Mde of Union Carbide 4201 XLPE Compound$^R$ | Ethylene-Vinyl Acetate Copolymer |
|---|---|---|
| Breakdown Voltage After Heat Treatment only kV | 45 (100%) | 42 (100%) |

TABLE 2-continued

| | Cables Mde of Union Carbide 4201 XLPE Compound[R] | Ethylene-Vinyl Acetate Copolymer |
|---|---|---|
| Breakdown Voltage After Heat Treatment and Electrochemical Treeing Test kV | 35 (75%) | 47 (112%) |

Table 2 indicates that within 24 days of electrochemical treeing test, breakdown voltage of conventional cables decreased by 25% while of the cables made of copolymer type compound increased by 12%. The latter increase in the breakdown voltage is attributed to relaxation of the insulation during the electrochemical treeing test. If, during the test, electrochemical trees would be developed in this insulation, the breakdown voltage would decrease in spite of the insulation relaxation.

It will be understood that the foregoing description of preferred embodiments of the present invention is for purposes of illustration only, and that the various structural and operational features as herein disclosed are susceptible to a number of modifications and changes, none of which entails any departure from the spirit and scope of the present invention as defined in the hereto appended claims.

What is claimed is:

1. A method for fabricating an electrochemical tree resistant high voltage electrical cable in a fluid-tight environment, said method comprising the steps of:

successively extruding under pressure an insulation structure comprising a conductor shield layer, an insulation layer and an insulation shield layer over a continuously advancing stranded cable conductor by passing said conductor through a first extrusion head and a second extrusion head, each of said heads including at least one die for extruding one of said layers over said conductor, wherein said heads and said dies apply external pressure inwardly against the layers;

applying internal pressure through said conductor outwardly against the insulation structure;

applying reduced external pressure inwardly against the insulation structure such that the extruded conductor exiting each of said heads and dies has a diameter greater than the inner diameter of the previous extrusion die, and wherein said external pressure and said reduced external pressure is always higher than said internal pressure;

curing the conductor shield layer, the insulation layer and the insulation shield layer by applying a heated pressurized curing medium to the outer surface of the insulation shield layer, and gradiently cooling the insulated cable to approximately room temperature with a pressurized cooling fluid while maintaining the internal pressure throughout said curing and cooling steps at a level lower than the external pressure applied during curing and cooling.

2. The method for fabricating insulated cable according to claim 1 wherein said internal pressure applying step is accomplished by:

injecting an inert gas into said cable core between approximately fifty pounds per square inch and five hundred pounds per square inch.

3. The method according to claim 2 wherein the inert gas is dry air or nitrogen.

4. The method according to claim 2 wherein the internal pressure on said insulation layer is less than the cooling fluid pressure.

5. The method according to claim 1 wherein said curing step is accomplished by subjecting the cable core to a curing medium at a pressure greater than two hundred pounds per square inch.

6. The method according to claim 5 wherein the pressure of the curing medium is equal to or greater than the cooling fluid pressure.

7. The method according to claim 5 wherein the curing medium is a fluid.

8. The method according to claim 1 wherein said curing step is accomplished by:

curing said cable core in a pipe having a diameter greater than the diameter of said cable core and less than fifty percent greater than the diameter of the insulated cable.

9. The method for fabricating insulated cable according to claim 1 wherein said first and said second extrusion heads are combined in one triple extrusion head and where said extruding step is accomplished by:

pressure extruding a conductor shield layer, insulation layer and insulation shield layer over said conductor in said triple extrusion head.

10. The method for fabricating insulated cable according to claim 1 wherein said extruding step is accomplished by:

pressure extruding a conductor shield and a first insulation layer over said core in a dual head, pressure extruding a second insulation layer and an insulation shield over said first insulation layer in a second dual head, and maintaining an external pressure inwardly against said first insulation layer between said first head and said second head.

11. The method according to claim 1 wherein the thickness of said insulation layer is greater than 10 mils and less than 50 mils.

12. The method according to claim 1 wherein said curing step is accomplished by subjecting the cable core to a pressurized curing compound including at least one ingredient characterized by a dielectric constant less than 20, a resistivity greater than $10^{10}$ ohm-cm, a boiling point at curing pressure greater than 85° C. and a molecular weight of less than 300.

13. The method of claim 1 wherein said curing step is accomplished by subjecting the cable core to a pressurized curing compound selected from the group consisting of acetophenone, dodecyl benzene, polybutylene, and silicone fluid.

14. The method for fabricating insulated cable according to claim 1 wherein the internal pressure on the insulation layer is applied by a gas or liquid having a pressure greater than fifty pounds per square inch and less than five hundred pounds per square inch.

15. A method for fabricating an electrochemical tree resistant high voltage electrical cable in a fluid-tight environment comprising the steps of:

extruding a conductor shield under pressure over a continuously advancing cable, utilizing a first die and dual head;

extruding a first insulation layer under pressure over said conductor shield utilizing a second die in said first dual head;

applying external pressure inward on the insulation layer and internal pressure through said conductor on the conductor shield;

maintaining said external pressure greater than said internal pressure;

extruding a second insulation layer under pressure over said insulation layer utilizing a third die and second dual head;

extruding an insulation shield under pressure over said second insulation layer utilizing a fourth die and said second dual head;

maintaining external pressure on said insulation shield and internal pressure on said cable core to form an insulation structure having a diameter at least three percent greater than the diameter of said fourth die upon leaving said second dual head;

curing said insulation structure in a curing pipe, having a diameter greater than the diameter of said fourth die and less than fifty percent greater than the diameter of said insulated cable, with a curing liquid at a pressure not lower than two hundred and fifty pounds per square inch;

gradiently cooling said insulation structure in a cooling pipe with a pressurized curing fluid to form an insulated cable while maintaining the internal pressure throughout said curing and cooling steps at a level lower than the external pressure applied during curing and cooling.

16. The method in accordance with claim 11 wherein said curing medium is selected from the group consisting of:

acetophenone;
polybutene;
dodecylbenzene; and
silicone fluid.

17. The method in accordance with claim 9 wherein said internal pressure is applied by a fluid comprising nitrogen gas or dry air at a pressure in the range of approximately 2 to 25 atmospheres.

18. A method for fabricating an electrochemical tree resistant high voltage electrical cable in a fluid-tight environment comprising the steps of:

passing a continuously advancing cable conductor through a means for extruding a multi-layer insulation structure over said conductor, said extrusion means comprising at least one head and a plurality of successive extrusion dies, wherein external pressure is applied inwardly against the insulation structure by said extrusion means, applying internal pressure through said conductor, said internal pressure not exceeding said external pressure, allowing the diameter of the insulated cable exiting said extrusion means to become greater than the diameter of the last extrusion die of said means by reducing said external pressure, curing the insulated cable by applying a heated, pressurized curing medium to the outer surface of said insulation structure while maintaining internal pressure through said conductor, and gradiently cooling the cured insulated cable with an externally applied pressurized cooling fluid to about room temperature while maintaining internal pressure through said conductor, the external pressure applied to the insulation being greater than the internal pressure applied during curing and cooling.

19. The method according to claim 7 wherein the curing fluid is at a temperature above 240° F. and below 550° F.

20. The method according to claim 1 wherein the pressurized cooling fluid used for gradient cooling is at a temperature such that a difference of about 150° F. is maintained between the temperature of the conductor and the insulation shield layer.

21. The method according to claim 1 wherein the diameter of the insulated cable exiting each extrusion head and die is at least 3% greater than the inner diameter of the previous die.

* * * * *